US008687148B2

(12) United States Patent
Kubota et al.

(10) Patent No.: US 8,687,148 B2
(45) Date of Patent: Apr. 1, 2014

(54) LIQUID CRYSTAL DISPLAY DEVICE (75) Inventors: Hidenao Kubota, Yokohama (JP); Hiroshi Iwasa, Hayama (JP); Koichi Sakita, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 367 days.

(21) Appl. No.: 12/914,915

(22) Filed: Oct. 28, 2010

(65) Prior Publication Data
US 2011/0228196 A1 Sep. 22, 2011

(30) Foreign Application Priority Data

Mar. 19, 2010 (JP) ................. 2010-064321

(51) Int. Cl.
*G02F 1/1335* (2006.01)
(52) U.S. Cl.
USPC ............................. 349/69; 349/62
(58) Field of Classification Search
USPC ..................... 349/149–152, 62–69
See application file for complete search history.

(56) References Cited

U.S. PATENT DOCUMENTS

| | | |
|---|---|---|
| 2004/0212982 A1 | 10/2004 | Chang |
| 2007/0030694 A1 | 2/2007 | Lim |
| 2007/0242477 A1 | 10/2007 | Yoo et al. |
| 2008/0117355 A1 | 5/2008 | Mori |
| 2009/0122227 A1 | 5/2009 | Hong et al. |
| 2010/0002169 A1 | 1/2010 | Kuramitsu et al. |
| 2010/0110330 A1 | 5/2010 | Ajichi et al. |
| 2010/0259470 A1 | 10/2010 | Kohtoku et al. |
| 2010/0265694 A1 | 10/2010 | Kim et al. |

FOREIGN PATENT DOCUMENTS

| | | |
|---|---|---|
| CN | 101495799 A | 7/2009 |
| CN | 101507002 A | 8/2009 |
| EP | 2 045 516 A1 | 4/2009 |
| EP | 2 063 296 A2 | 5/2009 |
| JP | 2004-349143 A | 12/2004 |
| JP | 2006-236701 A | 9/2006 |
| JP | 2006-276761 | 10/2006 |
| JP | 2007-294700 A | 11/2007 |
| JP | 2008-091114 | 4/2008 |
| JP | 2008-123973 A | 5/2008 |
| JP | 2009-231012 A | 10/2008 |
| JP | 2009-099497 A | 5/2009 |
| TW | 200420854 A | 10/2004 |
| WO | WO 2008/029540 A1 | 3/2008 |
| WO | WO 2009/110145 | 9/2009 |
| WO | WO 2010/100504 A1 | 9/2010 |

OTHER PUBLICATIONS

Extended European Search Report issued Oct. 26, 2011 in European Patent Application No. 10014086.2.

*Primary Examiner* — Phu Vu
(74) *Attorney, Agent, or Firm* — Miles & Stockbridge P.C.

(57) ABSTRACT

The present invention enables a liquid crystal display device using LEDs as a light source to reduce uneven brightness, increase efficiency of heat discharged from the LEDs, and provide area brightness control. The liquid crystal display device includes a liquid crystal display panel and a backlight. The backlight includes a light guide panel and a plurality of LEDs arranged on a line. The light guide panel includes a concave portion extending in a longitudinal direction of the light guide panel. A large number of LEDs are placed in the concave portion of the light guide panel. The plurality of LEDs arranged on a line emit light alternately in opposite directions. This configuration allows for uniform brightness distribution without forming a large number of concave portions in the light guide panel. Further, this configuration also allows for area brightness control by controlling a large number of LEDs by group.

6 Claims, 8 Drawing Sheets

FIG. 21

LIQUID CRYSTAL DISPLAY DEVICE

CLAIM OF PRIORITY

The present application claims priority from Japanese Patent Application JP 2010-064321 filed on Mar. 19, 2010, the content of which is hereby incorporated by reference into this application.

FIELD OF THE INVENTION

The present invention relates to a liquid crystal display device with LED as a backlight. More particularly, the invention relates to a liquid crystal display device that ensures high efficiency of the use of light from a light source with less uneven brightness.

BACKGROUND OF THE INVENTION

A liquid crystal display device includes a TFT substrate and a color filter substrate. The TFT substrate is configured such that pixel electrodes, thin film transistors (TFTs), and the like, are arranged in a matrix form. The color filter substrate is disposed opposite to the TFT substrate, in which color filters, and the like, are formed at locations corresponding to the pixel electrodes of the TFT substrate. A liquid crystal is interposed between the TFT substrate and the counter substrate. Thus, the liquid crystal display device forms an image by controlling the transmittance of light of the liquid crystal molecules for each pixel.

Liquid crystal display devices can be made thin and light weight, and are used in a wide range of applications. The liquid crystal does not emit light by itself, so that a backlight is provided in the back surface of a liquid crystal display panel to emit light. Fluorescent tubes have been used as a backlight for liquid crystal display devices having a relatively large screen such as TV. However, the fluorescent tube is filled with mercury vapor, imposing a heavy burden on the environment of the Earth. In particular in European countries, the use of such a fluorescent tube tends to be prohibited.

Under these circumstances, the fluorescent tube has been replaced by LED (light emitting diode) as a light source of the backlight. More and more liquid crystal display devices with LED light source are used every year also in large display devices such as TVs. The backlight of the liquid crystal display device requires a planar light source. However, the LED is a point light source. Thus, it is necessary to provide an optical system to form a planar light source by point light source LEDs.

JP-A No. 236701/2006 describes a configuration of a light guide panel formed directly under a liquid crystal display panel. The light guide panel includes concave portions arranged in line. Then, LEDs are placed in line in the concave portions. In other words, the configuration of JP-A No. 236701/2006 uses an optical component to diffuse light emitted from each LED from a side surface of the LED. A reflective sheet part of the optical component includes a diffuse reflection area 41DR having a diffuse reflection function, and a mirror reflection area 41R having a mirror reflection function. In this way, the light from the LEDs is intentionally diffused and reflected at a predetermined ratio, to improve the efficiency of the use of the light while preventing uneven brightness.

The technology described in JP-A No. 236701/2006 requires the reflective sheet part to include the diffuse reflection area 41DR having a diffuse reflection function, as well as the mirror reflection area 41R having a mirror reflection function. For this reason, the optical design is complicated. Further, when LED is used as a light source, heat generated by the LED is an important problem. However, there is no description of the problem of heat generation in JP-A No. 236701/2006.

SUMMARY OF THE INVENTION

It is desirable to have a configuration that can use LED as a backlight of a liquid crystal display device and can prevent heat generated by the LED, with a relatively simple configuration.

The present invention overcomes the above problems by means described in detail below.

(1) There is provided a liquid crystal display device including a liquid crystal display panel and a backlight. The backlight includes a light guide panel, an optical sheet, and a light source having a plurality of LEDs. The light guide panel includes a concave portion extending parallel to a side of the light guide panel. The plurality of LEDs are placed in the concave portion, arranged on a line in an extending direction of the concave portions of the light guide panel. The plurality of LEDs emit light parallel to a main surface of the light guide panel. First LEDs of the plurality of LEDs emit light in a first direction. Second LEDs of the plurality of LEDs emit light in a direction opposite to the first direction. The first LEDs and the second LEDs are arranged alternately in the extending direction of the concave portion.

(2) There is provided a liquid crystal display device including a liquid crystal display panel and a backlight. The backlight includes a light guide panel, an optical sheet, and a light source having first LEDs and second LEDs. The light guide panel includes a concave portion extending parallel to a side of the light guide panel. The first LEDs and the second LEDs are placed in the concave portion. The first LEDs are placed on a first line. The second LEDs are placed on a second line. The first and second lines are parallel to each other. The first LEDs emit light in a first direction. The second LEDs emit light in a direction opposite to the first direction. The first LEDs and the second LEDs are arranged alternately in an extending direction of the concave portion.

(3) There is provided a liquid crystal display device including a liquid crystal display panel and a backlight. The backlight includes a light guide panel, an optical sheet, and a light source. The light source includes a first wiring substrate having first LEDs and a second wiring substrate having second LEDs, the first wiring substrate and the second wiring substrate being bonded to both sides of a metal plate. The first LEDs are arranged on a first line, and the second LEDs are arranged on a second line. The light guide panel includes a concave portion extending parallel to a side of the light guide panel. The light source is placed in the concave portion. The first LEDs emit light in a first direction, and the second LEDs emit light in a direction opposite to the first direction. The first LEDs and the second LEDs are arranged alternately in an extending direction of the concave portion.

(4) In the light source described in (3), the first wiring substrate and the second wiring substrate are bonded to a thermal conductive sheet.

(5) There is provided a liquid crystal display device, in which a leader line for supplying current to LEDs is formed on the outside of the LEDs arranged on a line, so that a connector for supplying current to the LEDs is provided only in one end portion.

According to the present invention, the LEDs arranged on a line are placed in the concave portion of the light guide panel, in which light is emitted from the LEDs alternately in opposite directions. As a result, the backlight without uneven brightness can be formed with a simple configuration.

Further, according to the present invention, the light guide panel is divided into a plurality of areas to facilitate area brightness control in the screen. Also, according to the present invention, heat generated by the LED can be easily discharged to the chassis or other components of the liquid crystal display device.

Still further, according to the present invention, the connector can be formed only in one end portion of the liquid crystal display device. As a result, the overall size of the liquid crystal display device can be reduced.

DETAILED DESCRIPTION OF THE PREFERRED EMBODIMENTS

Hereinafter, preferred embodiments of the present invention will be described in detail.

First Embodiment

Figure 1:
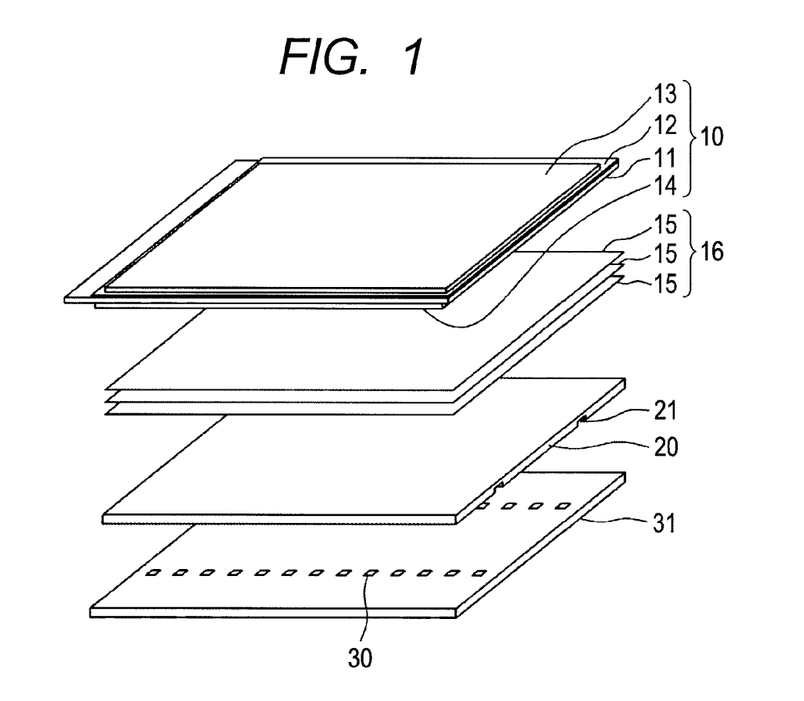
FIG. 1 is an exploded perspective view of a liquid crystal display device.

FIG. 1 is an exploded perspective view of a liquid crystal display device. The liquid crystal display device in FIG. 1 is divided into two parts: a liquid crystal display panel 10 and a backlight. In FIG. 1, a TFT substrate 11 includes a display area in which TFTs and pixel electrodes are arranged in a matrix form, scan lines, and image signal lines. A counter substrate 12 includes color filters and the like. The TFT substrate 11 and the counter substrate 12 are bonded together by an adhesive not shown. There is a liquid crystal, not shown, interposed between the TFT substrate 11 and the counter substrate 12.

A lower polarization plate 14 is attached to the underside of the TFT substrate 11, and an upper polarization plate 13 is attached to the upper side of the counter substrate 12. The state in which the TFT substrate 11, the counter substrate 12, the lower polarization plate 14, and the upper polarization plate 13 are bonded is called the liquid crystal display panel 10. The backlight is provided on the back side of the liquid crystal display panel 10. The backlight includes a light source unit and various types of optical components.

In FIG. 1, the backlight includes an optical sheet group 16, a light guide panel 20, and a wiring substrate 31 on which LEDs 30 are arranged, in order from the side of the liquid crystal display panel 10. The optical sheet group 16 in FIG. 1 uses three diffusion sheets 15. Here, the so-called prism sheet may be included in the optical sheet group 16. The number of diffusion sheets 15 may be one or two.

The optical sheet group 16 is placed on the light guide panel 20. The light guide panel 20 has a role to direct the light from a large number of LEDs 30, as a uniform planar light source, to the side of the liquid crystal display panel 10. The light guide panel 20 has a thin planar shape. A concave portion 21 is formed on the underside of the light guide panel 20, extending in the lateral direction.

The wiring substrate 31 is provided under the light guide panel 20. The LEDs 30 are arranged in line on the wiring substrate 31. In the following description, it is assumed that the LEDs 30 according to this embodiment are white LEDs 30. However, the present invention described below can also be applied to the use of monochrome LEDs 30 with a careful mixture of the three colors.

When the light guide panel 20 and the wiring substrate 31 are combined together, the LEDs 30 arranged in line are placed in the concave portion 21 extending in the lateral direction on the lower surface of the light guide panel 20. Because of this arrangement of the LEDs 30, it is possible to reduce the area of the frame part around the display area of the liquid crystal display device, compared to the case of the conventional side-light type backlight. In addition, such an arrangement allows for area brightness control in the screen.

Figure 2:
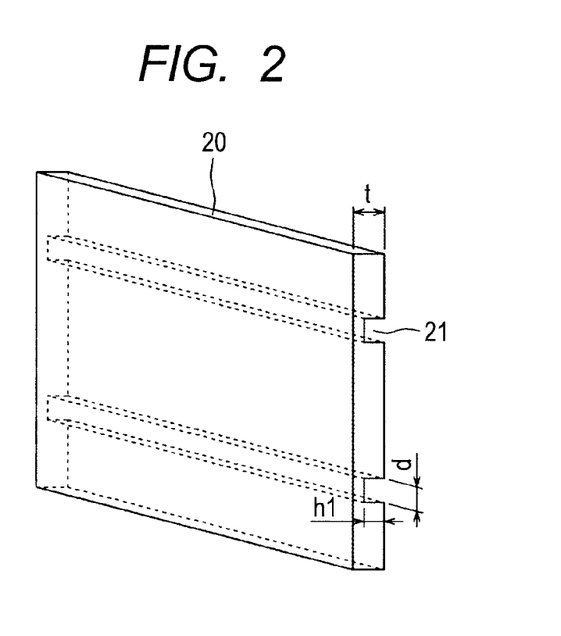
FIG. 2 is a perspective view of a light guide panel according to the present invention.

FIG. 2 is a perspective view of the light guide panel 20 used in FIG. 1. In FIG. 2, the concave portions 21 extend in the lateral direction of the light guide panel 20. The thickness t of the light guide panel 20 is, for example, 3 to 5 mm. The height h1 of the concave portion 21 is about 2 to 3 mm. The width d of the concave portion 21 is about 3 to 4 mm. The LEDs 30 arranged in line on the wiring substrate 31 are placed in each of the concave portions 21.

Figure 3:
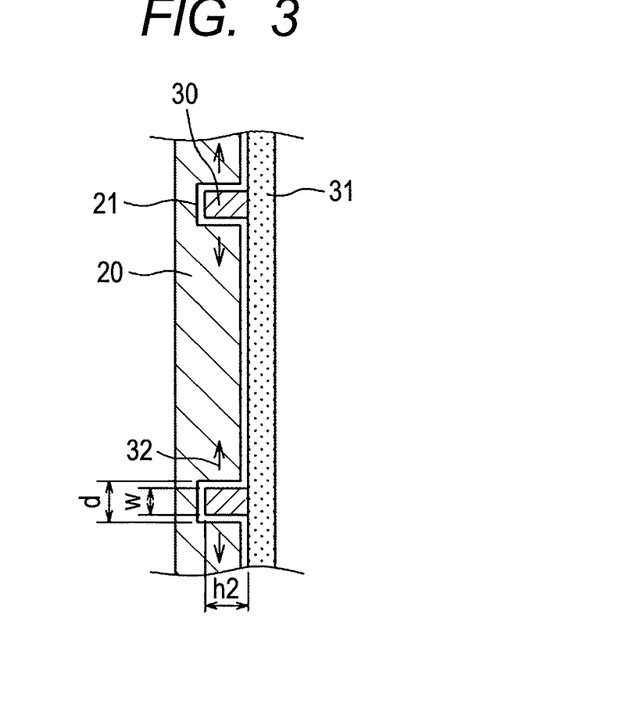
FIG. 3 is a cross-sectional view in which LEDs are mounted in the light guide panel.

FIG. 3 is a cross-sectional view in which the LEDs 30 are placed in the concave portions 21 of the light guide panel 20. The height h2 of the LED 30 is, for example, 1.6 mm. The width w of the LED 30 is, for example, 1.2 mm. Although not shown, the length in the depth direction of the LED 30 is about 3 mm. In FIG. 3, the light from the LEDs 30 is diffused in a planar direction of the light guide panel 20, as indicated by arrow 32 in the figure.

Figure 4:
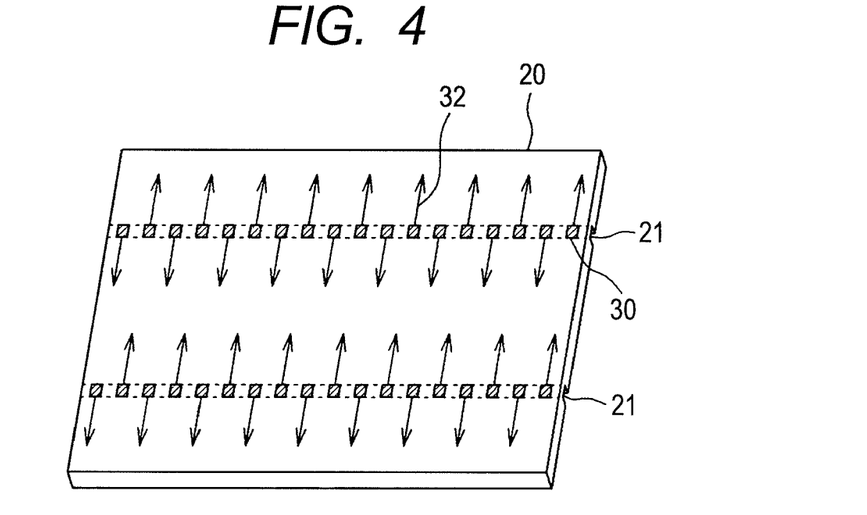
FIG. 4 is a perspective view in which LEDs are mounted in the light guide panel.

FIG. 4 is a perspective view in which the LEDs 30 arranged in line are placed in the concave portions 21 of the light guide panel 20, with the light emission direction from each LED 30. In FIG. 4, the LEDs 30 that emit light in a first direction, and the LEDs 30 that emit light in the direction opposite to the first direction are arranged alternately in the light guide panel 20. In other words, FIG. 4 shows the LEDs 30 placed in the concave portions 21 of the light guide panel 20 in such a manner that the side-by-side LEDs 30 emit light in opposite directions to each other. Because of this arrangement, it is possible to cover almost all the area of the light guide panel 20 by two rows of the LEDs 30.

Figure 5:
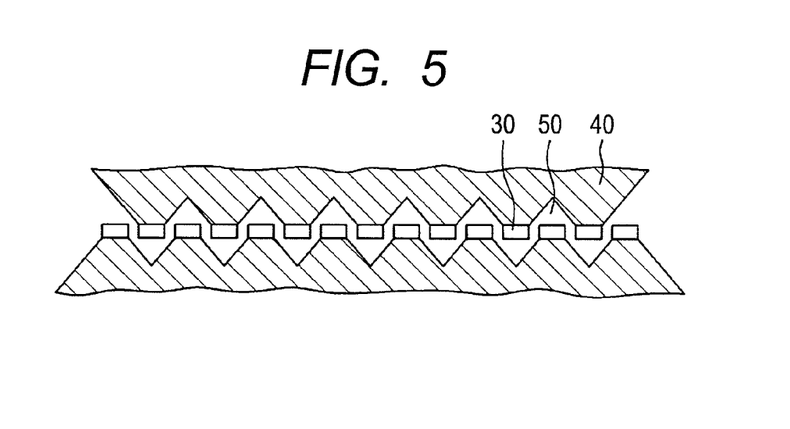
FIG. 5 is a top view of the arrangement of LEDs with emission directions according to a first embodiment.

FIG. 5 is a schematic view showing an emission area 40 of the light emitted from the LEDs 30 arranged in line. The LEDs emit light alternately in the same direction. The light emitted from each LED 30 is mixed with the light from the other LEDs 30. Thus, it is possible to ensure the uniformity of the brightness.

Figure 6:
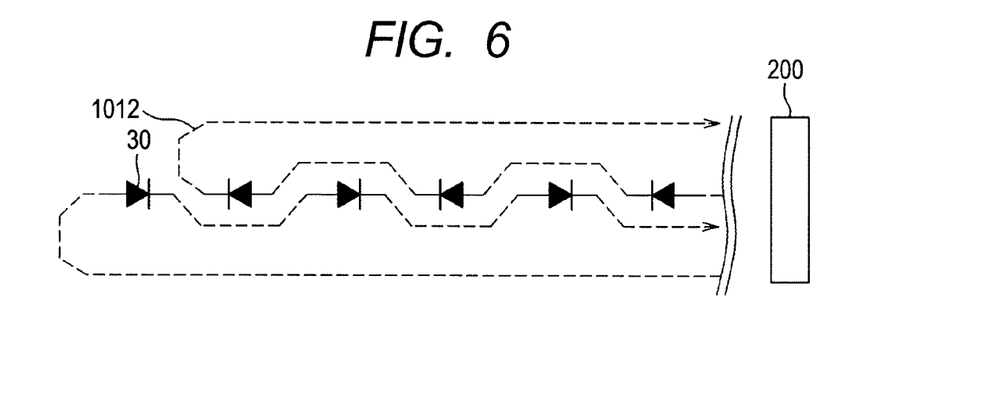
FIG. 6 is a wiring diagram in a wiring substrate with LEDs according to the first embodiment.

FIG. 6 is a circuit diagram of an example of wiring for supplying power to the LEDs 30 arranged in line. In FIG. 6, the anode-cathode direction of the LEDs 30 is different for each light emitting direction of the LEDs 30. The feature in FIG. 6 is that leader lines 1012 for the power supply to the LEDs 30 are formed on the outside of the row of the LEDs 30. With the wiring described above, it is possible to increase the width of the electrode portions of the LEDs 30. As a result, heat generated by the LEDs 30 can be discharged more effectively. In addition, a connector 200 for supplying current to the LEDs can be provided only in one direction.

Figure 7:
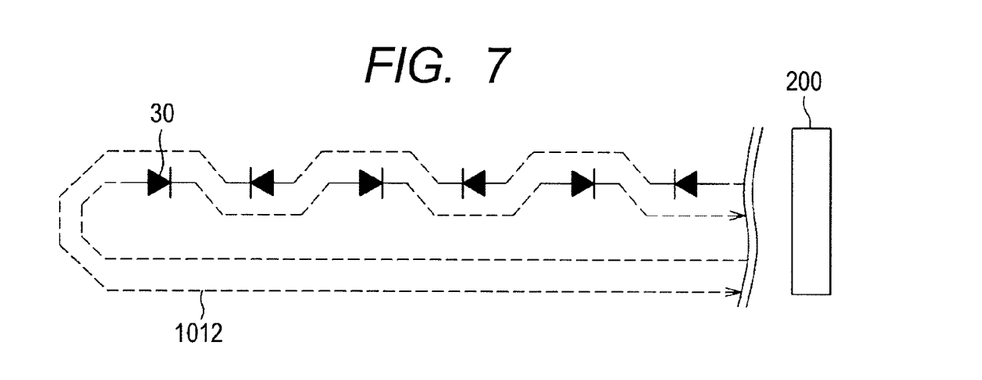
FIG. 7 is another wiring diagram in the wiring substrate with LEDs according to the first embodiment.

FIG. 7 is a circuit diagram of another example of wiring for the power supply to the LEDs 30 arranged in line. In FIG. 7, both the two leader lines 1012 for supplying power to the LEDs 30 are provided in the lower side of FIG. 7. Also with the wiring described above, it is possible to increase the width of the electrode portions of the LEDs 30. As a result, heat generated by the LEDs 30 can be discharged more efficiently. In addition, the connector 200 for supplying current to the LEDs can be provided only in one direction.

Figure 8:
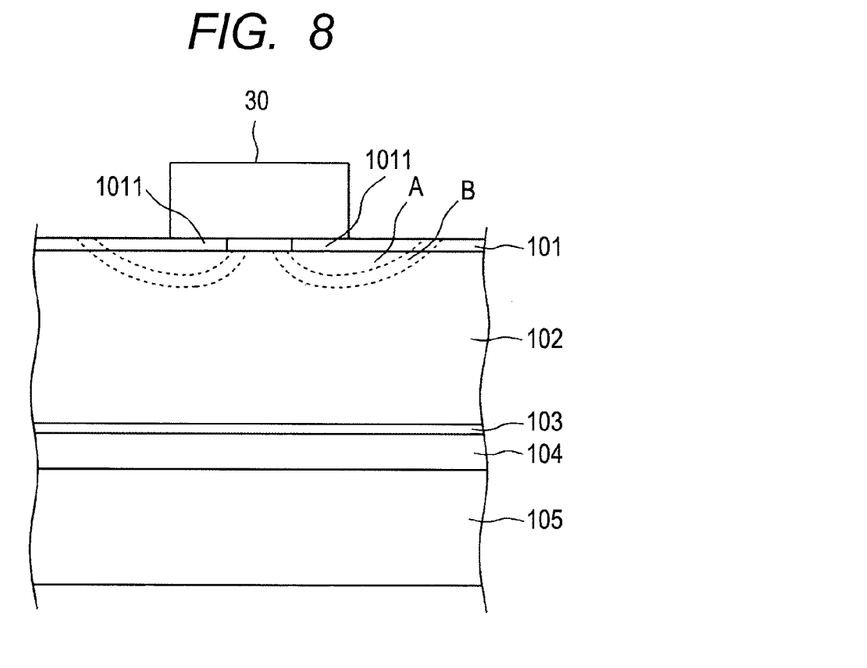
FIG. 8 is a cross-sectional view showing the temperature distribution in the wiring substrate on which LEDs are mounted.

FIG. 8 is a schematic view of an example of the temperature distribution in the wiring substrate 31 in which current flows through the LEDs mounted on the wiring substrate 31. In FIG. 8, the wiring substrate 31 is formed in such a manner that wiring of copper is formed on a glass epoxy substrate 102. The copper wiring is formed on the front and back sides of the glass epoxy substrate 102. Copper wiring 101 on the front side and copper wiring 103 on the back side are electrically coupled by a through hole not shown.

The wiring substrate 31 and a chassis 105 formed of metal are bonded by a thermal conductive sheet 104. The chassis 105 is formed of metal as a heat sink. In FIG. 8, the front-side copper wiring 101 includes copper electrodes for the LED 30 in the connection part of the copper wiring 1011 and the LED 30. The copper electrode 1011 and the LED 30 are connected by solder, which is omitted in FIG. 8.

In the cross-sectional view of the wiring substrate 31 in FIG. 8, the areas A and B represent the temperature distribution. The area A is the portion of the highest temperature. As shown in FIG. 8, the area A is a very narrow part in the vicinity of the copper electrode 1011. The area B of the next higher temperature also appears in the vicinity of the copper electrode. In other words, taking into account the heat discharge from the LEDs 30, it is more efficient to use the configuration for discharging heat in the part of the LED 30 connected to the electrodes.

Figure 9:
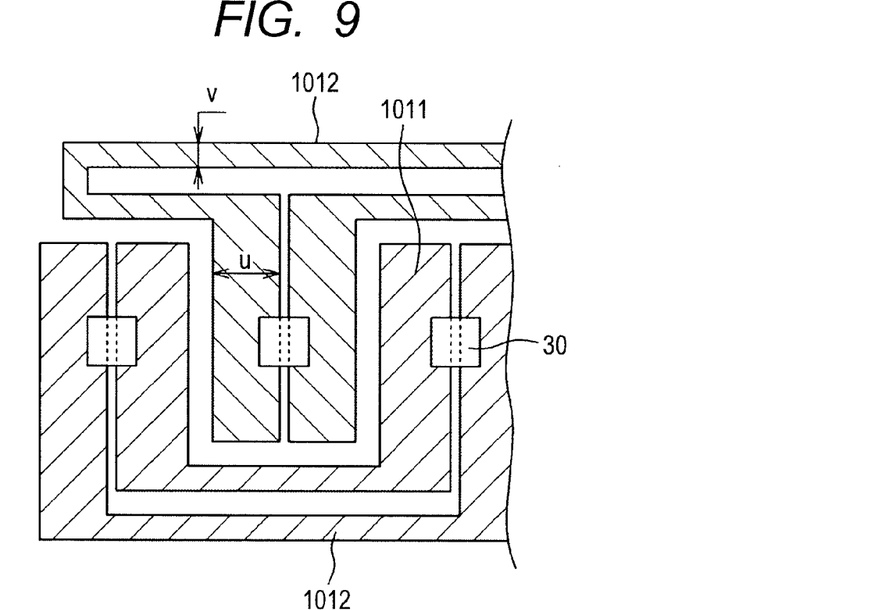
FIG. 9 is a detailed view of copper wiring in the wiring substrate according to the first embodiment.

FIG. 9 is a top view of the LEDs 30 mounted in the wiring substrate 31 with the wiring connecting the LEDs 30. The wiring is formed of copper. In FIG. 9, the portions 1011 of the wiring correspond to the electrodes for the LEDs 30. The width u of the electrode portion 1011 is greater than the width v of the leader portion 1012. In other words, as shown in FIG. 8, the heat generated by the LED 30 is discharged in particular in the vicinity of the electrode. For this reason, the width of the copper electrode portion 1011 of the LED 30 is increased as much as possible to increase the efficiency of discharging heat from the LED 30. The heat from the LED 30 propagates to the glass epoxy through the cupper electrode 1011, and is absorbed by the chassis 105.

Figure 10:
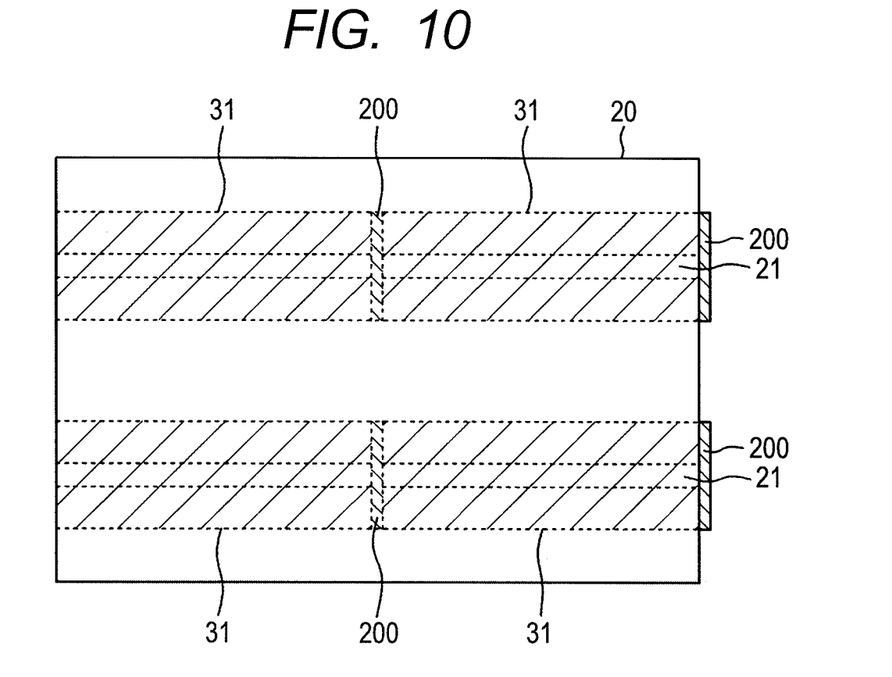
FIG. 10 is a top view of the arrangement of connectors to supply current to the LEDs, according to the present invention.

FIG. 10 is a top view of the light guide panel 20 seen from the top. In FIG. 10, the wiring substrate 31 provided under the light guide panel 20 is seen through the light guide panel 20. In FIG. 10, four wiring substrates 31 are formed for the concave portions 21 formed in the light guide panel 20. The LEDs 30, not shown, are mounted on the wiring substrate 31 and placed in the concave portion 21 of the light guide panel 20.

In FIG. 10, two of the four wiring substrates 31 arranged side by side are connected by the connector 200, and connected to an external circuit by the connector 200 provided in the wiring substrate 31 on the right side. As shown in FIG. 10, the connectors 200 are provided only on the right side. In order to achieve this, as shown in FIG. 6 or 7, the leader lines 1012 for supplying current to the LEDs 30 extend outside the rows of the LEDs 30 to the side of the connector 200.

The shorter the leader line the better, considering the resistance to the current flowing through the LEDs 30. From this point of view, it is preferable that the connector 200 is provided on both sides of the wiring substrate 31 to supply current to the LEDs 30. In this embodiment, however, the length of the leader line 1012 is intentionally increased to provide the connector 200 in one portion. In this way, it is possible to reduce the overall size of the liquid crystal display device.

In the configuration of the present invention, the LEDs 30, each of which is a point light source, are arranged in line inside the light guide panel 20 in order to control the brightness in each area of the screen. As for the area brightness control, for example, there is a control method for lighting the LEDs 30 in bright parts of the screen but not lighting the LEDs 30 in dark parts.

Such an area control can be performed by storing image information in a frame memory, differentiating between bright parts and dark parts in the screen, and lighting the LEDs 30 only in the area corresponding to the bright part. By performing this area brightness control, it is possible to reduce power consumption and to increase contrast.

Figure 11:
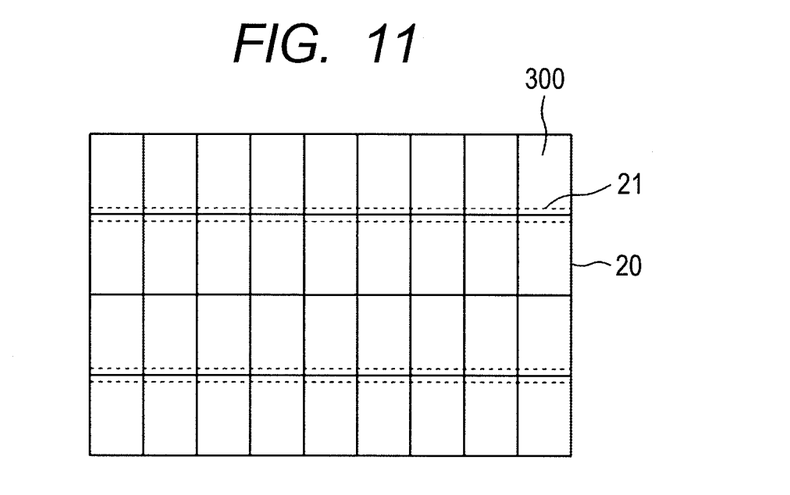
FIG. 11 shows an example of area division for area brightness control.

FIG. 11 is a view of the light guide panel 20 divided into 36 areas. The number of division blocks 300 of the light guide panel 20 is equivalent to the number of divisions of the screen. It is to be noted that the lines of the division blocks 300 in FIG. 11 show the state of division in the figure. Such lines are not actually present in the light guide panel 20. In FIG. 11, the LEDs 30, not shown, are placed in the concave portions 21 of the light guide panel 20.

Figure 12:
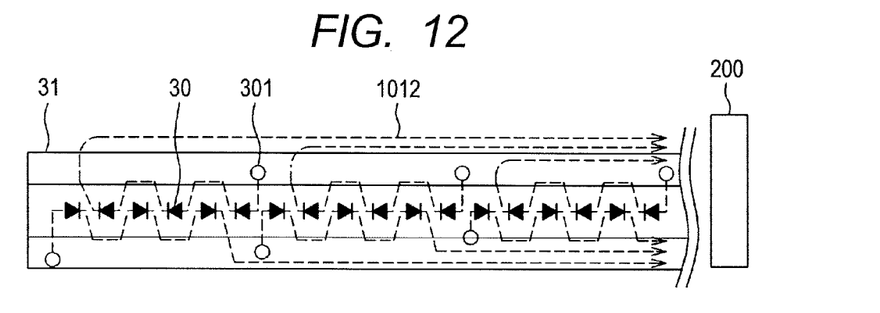
FIG. 12 is a view of the arrangement of LEDs for the area brightness control.
Figure 21:
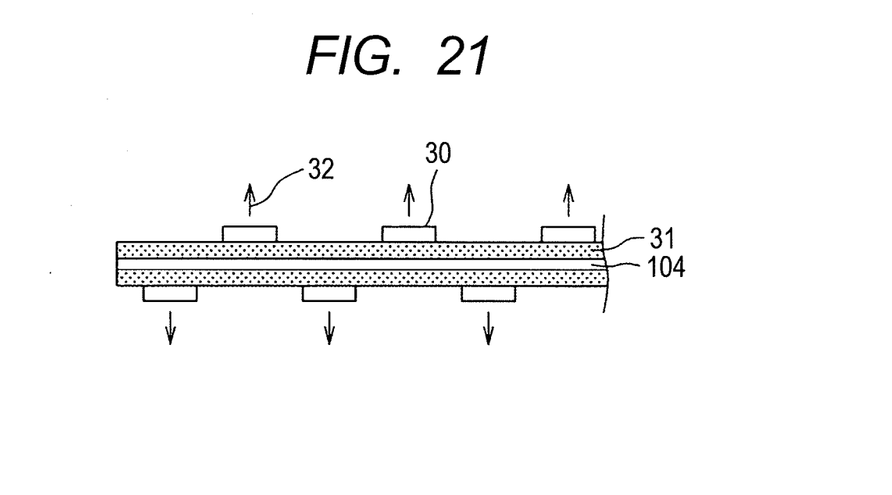
FIG. 21 is a top view of a light source according to a fourth embodiment.

As shown in FIG. 4, the light is emitted from the row of the LEDs 30 placed in the concave portion 21 to both sides of the light guide panel 20. In this way, the entire area of the screen can be covered by two rows of the LEDs 30 placed in the concave portions 21. FIG. 12 shows an example of the arrangement of the LEDs 30 for area control. FIG. 12 is an example of the LEDs 30 placed in the concave portion 21 of the light guide panel 20. In FIG. 12, six LEDs 30 are one group. Then, electrode pads 301 are provided for each group of six LEDs 30.

Each group of six LEDs 30 in FIG. 12 is assigned to blocks above and below the concave portion 21 of the light guide panel 20 shown in FIG. 11. In other words, light is supplied from three of the six LEDs 30 to the block 300 on the upper side of the concave portion 21, in FIG. 12, of the light guide panel 20 shown in FIG. 11. While light is supplied from the other three LEDs 30 to the block 300 on the lower side of the concave portion 21 of the light guide panel 20 shown in FIG. 12. As described above, according to the present invention, the entire area of the screen can be controlled by the LEDs 30 arranged in two rows.

Second Embodiment

In the first embodiment, the LEDs 30 are arranged on a single line. In this case, as shown in FIG. 5, a dark part 50 occurs in the vicinity of the portion not irradiated by the light from the LED 30. The dark part 50 like this may cause uneven brightness. In a second embodiment, a positional offset is set alternately for each of the LEDs 30 arranged in line to reduce the area of the dark part 50, thereby reducing the uneven brightness.

Figure 13:
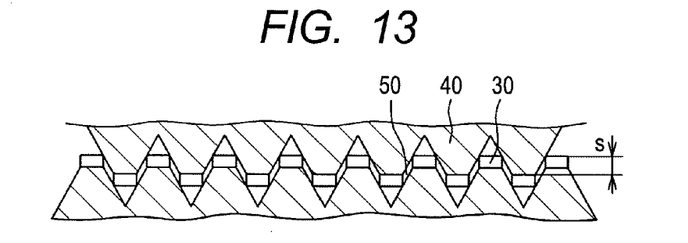
FIG. 13 is a top view of the arrangement of LEDs with emission directions according to a second embodiment.

FIG. 13 is a schematic view of the arrangement of the LEDs 30 with the light emission area according to this embodiment. As shown in FIG. 13, an offset S is set according to the light emitting direction. As can be seen by comparing with FIG. 5, the offset S set as described above substantially reduces the area of the dark part 50 not irradiated by the light of the LED 30. In FIG. 13, first LEDs are arranged on a first line, and second LEDs are arranged on a second line. Then, the first LEDs emit light in the direction of the second line, and the second LEDS emit light in the direction of the first line.

Figure 14:
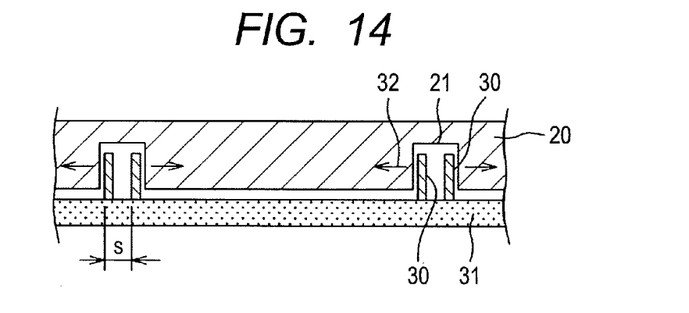
FIG. 14 is a cross-sectional view in which LEDs are mounted in the light guide panel according to the second embodiment.

FIG. 14 is a cross-sectional view in which the LEDs 30 are placed in the concave portions 21 of the light guide panel 20 in the manner described above. In FIG. 14, the LEDs 30 arranged in the same concave portion are displaced in the direction perpendicular to the paper.

Figure 15:
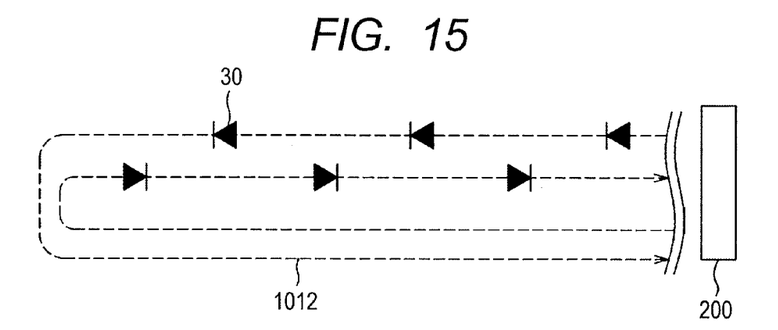
FIG. 15 is a wiring diagram in the wiring substrate with LEDs according to the second embodiment.
Figure 16:
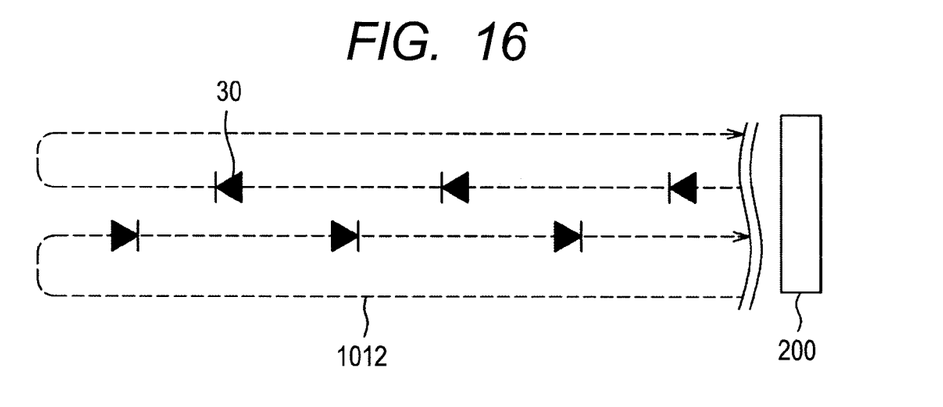
FIG. 16 is another wiring diagram in the wiring substrate with LEDs according to the second embodiment.

The light emission direction of each LED 30 is indicated by the arrow 32. FIG. 15 shows an example of wiring for such an arrangement of the LEDs 30. Also in FIG. 15, the leader lines 1012 for supplying current to the LEDs 30 are formed on the outside of the rows of the LEDs 30. In this way, the connector 200 can be provided only on one side of the wiring substrate 31. FIG. 16 shows another example of wiring for the arrangement of the LEDs 30 according to this embodiment. Also in FIG. 16, the leader lines 1012 are formed on the outside of the respective rows of the LEDs 30.

Figure 17:
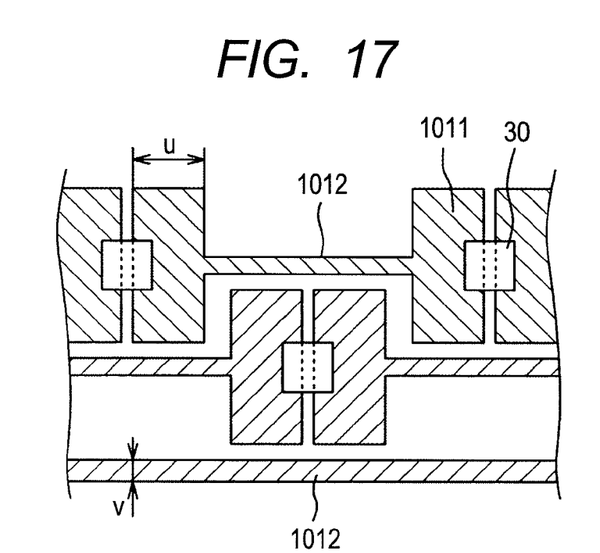
FIG. 17 is a detailed view of copper wiring in the wiring substrate according to the second embodiment.

FIG. 17 is a top view of the LEDs 30 mounted in the wiring substrate 31, showing wiring for connecting the LEDs 30 according to this embodiment. The wiring is formed of copper. In FIG. 17, the portions 1011 of the wiring correspond to the electrodes for the LEDs 30. The width u of the electrode portions 1011 is greater than the width v of the leader portions 1012. As described in the first embodiment, the heat generated by the LED 30 is discharged, in particular, in the vicinity of the electrodes. For this reason, the width of the portion of the cupper electrodes 1011 of the LED 30 is increased as much as possible to improve the efficiency of discharging heat from the LED 30.

Third Embodiment

The LEDs 30 used in the first and second embodiments are the LEDs of the so-called side view type in which the light is emitted in the lateral direction. This embodiment describes a configuration of the backlight using the LEDs 30 of the so-called top view type in which the light is emitted from the top side of the LEDs 30.

Figure 18:
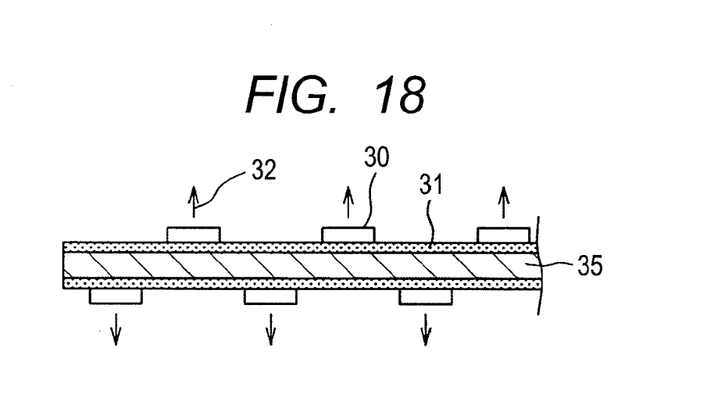
FIG. 18 is a top view of a light source with LEDs according to a third embodiment.

The configuration of the liquid crystal display device is the same as described in FIG. 1. Further, the light guide panel 20 used herein is also the same as described in FIG. 2. This embodiment uses the top view type LEDs 30 to be placed in the concave portions 21 of the light guide panel 20 shown in FIG. 2. FIG. 18 is a top view of a light source placed in the concave portion 21 of the light guide panel 20. In FIG. 18, the wiring substrate 31 of glass epoxy on which wiring is formed is attached to both sides of an Al substrate 35. The LEDs 30 are mounted on the wiring substrate 31. This configuration is hereinafter referred to as a light source assembly.

In FIG. 18, the LEDs 30 are the top view type. The LEDs 30 are attached to both sides of the Al substrate 35 and emit light in a lateral direction indicated by the arrow 32. In FIG. 18, the Al substrate 35, which is formed in the central portion of the light source assembly, discharges heat from the LEDs 30 in an efficient manner.

Figure 19:
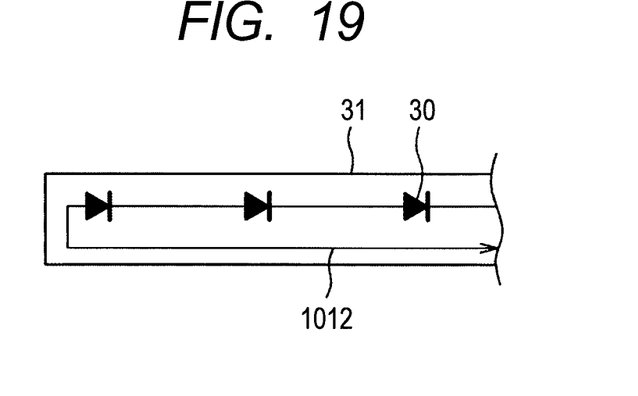
FIG. 19 is a side view of LEDs and a leader line according to the third embodiment.

FIG. 19 is a schematic view of the side of the light source shown in FIG. 18. The LEDs 30 are provided on the upside of the wiring substrate 31 formed of glass epoxy. The leader line 1012 for supplying current to the LEDs 30 is provided below the LEDs 30. With this configuration, the connector 200 can be provided only on one side of the light guide panel 20.

Figure 20:
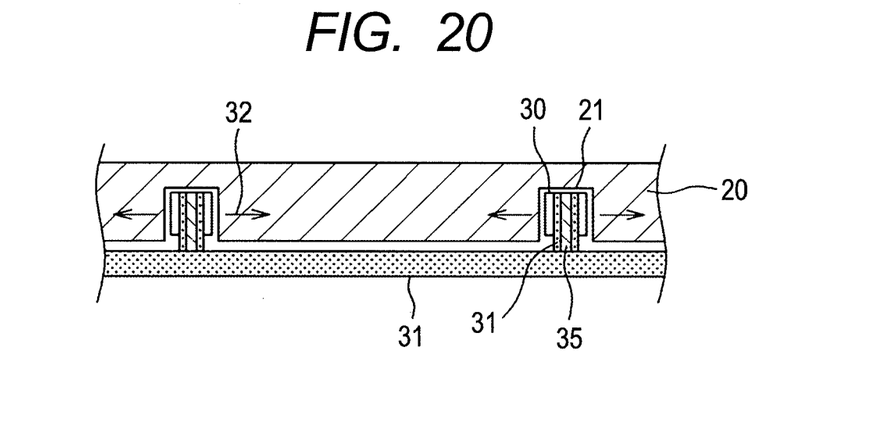
FIG. 20 is a cross-sectional view in which LEDs are mounted in the light guide panel according to the third embodiment.

FIG. 20 is a cross-sectional view in which the LED arrays shown in FIG. 18 are placed in the concave portions 21 of the light guide panel 20. In FIG. 20, the light from each LED is emitted in the direction of the arrow 32. In FIG. 20, shows that the light source assemblies are placed in the concave portions 21 formed in the light guide panel 20. The configuration of the light source assembly is as follows. The wiring substrate 31 formed of glass epoxy is provided on both sides of the central Al substrate 35. The LEDs 30 are mounted on each of the wiring substrates 31. The LEDs 30 are arranged alternately on both sides of the central Al substrate 35 as shown in FIG. 18. The light source assembly is connected to the wiring substrate 31 provided below the light guide panel 20.

The LEDs 30 are the top view type. Thus, in the light source assembly, the LEDs 30 emit light in a lateral direction as indicated by the arrow in FIG. 20. According to this embodiment, the Al substrate 35 is provided in the central portion of the light source-assembly, so that the heat generated by the LEDs 30 can be discharged in an efficient manner.

Fourth Embodiment

This embodiment also describes the light source assembly using the LEDs 30 of the so-called top view type. FIG. 21 is a top view of the light source assembly according to this embodiment. In FIG. 21, the top-view type LEDs 30 are mounted on the wiring substrate 31 formed of glass epoxy. The light from the LEDs 30 is emitted in the direction of the arrow 32. Two wiring substrates 31 formed of glass epoxy on which the LEDs 30 are mounted are bonded together by the thermal conductive sheet 104. An example of the thermal conductive sheet 104 is Si resin with relatively good conduction of heat.

As shown in FIG. 21, the LEDs 30 on the two wiring substrates 31 are arranged alternately in the extending direction of the light source assembly. Here the LEDs 30 are the top view type, so that in the light source assembly the light is emitted in a lateral direction as indicated by the arrow in FIG. 21. The fourth embodiment is the same as the third embodiment, except that the thermal conductive sheet 104 is provided in the central portion of the light source assembly. The fourth embodiment uses the thermal conductive sheet 104 instead of the Al substrate 35, in order to reduce the thickness of the light source assembly. In this way, the effect on the uneven brightness can be reduced.

Fifth Embodiment

In the first to fourth embodiments, the light source according to the present invention is used for the backlight of the liquid crystal display device. However, the light source according to the present invention can be used not only in the liquid crystal display device but also in general lighting. For example, as shown in FIG. 4, the concave portions 21 are formed in the light guide panel 20. A plurality of the LEDs 30 described in the first embodiment are placed in the concave portions 21. Then, the light guide panel 20 in FIG. 4 is placed downward on a ceiling or other surface. In this way, a planar light source can be formed.

Further, by using the wiring substrate 31 shown in FIG. 6 or 7, it is possible to provide the connector 200 only on one side of the light guide panel 20 to supply current to the LEDs 30. This arrangement can make the current supply substantially the same as the current supply to conventional fluorescent tubes. The light guide panel 20 can be a plate of resin such as polycarbonate. Further, the concave portion 21 can be easily formed by press working.

The above description of the lighting has been given according to the first embodiment. However, the backlight with the configuration of the second or third embodiment can also be used in lighting equipment.

What is claimed is:

1. A liquid crystal display device comprising a liquid crystal display panel and a backlight,
wherein the backlight includes a light guide panel, an optical sheet, and a light source having first LEDs and second LEDs,
wherein the light guide panel includes a concave portion extending parallel to a side of the light guide panel,
wherein the first LEDs and the second LEDs are placed in the concave portion,
wherein the first LEDs are arranged on a first line and the second LEDs are arranged on a second line,
wherein the first and the second lines are parallel to each other,
wherein the first LEDs emit light in a first direction, and the second LEDs emit light in a direction opposite to the first direction,
wherein the first LEDs and the second LEDs are arranged alternately in an extending direction of the concave portion,
wherein light from the first LEDs is emitted in a direction from the first line toward the second line, and wherein light from the second LEDs is emitted in a direction from the second line toward the first line.

2. A liquid crystal display device comprising a liquid crystal display panel, a backlight, and a connector to supply power to the backlight,
wherein the backlight includes a light guide panel, an optical sheet, and a wiring substrate with a light source having first LEDs and second LEDs,
wherein the first LEDs and the second LEDs are supplied with power from the connector,
wherein the light guide panel includes a concave portion extending parallel to a side of the light guide panel,
wherein the first LEDs and the second LEDs are placed in the concave portion,
wherein the first LEDs are arranged on a first line and the second LEDs are arranged on a second line,
wherein the first and second lines are parallel to each other,
wherein the first LEDs emit light in a first direction, and the second LEDs emit light in a direction opposite to the first direction,
wherein the first LEDs and the second LEDs are arranged alternately in an extending direction of the concave portion,
wherein light from the first LEDs is emitted in a direction from the first line toward the second line,
wherein light from the second LEDs is emitted in a direction from the second line toward the first line,
wherein a leader line for connecting one terminal of the first LEDs in the wiring substrate with the connector exists outside the first LEDs arranged on the first line,
wherein a leader line for connecting one terminal of the second LEDs in the wiring substrate with the connector exists outside the second LEDs arranged on the second line, and
wherein the connector for supplying power to the backlight exists on one side of the light guide panel and not on the other sides of the light guide panel.

3. A liquid crystal display device comprising a liquid crystal display panel and a backlight,
wherein the backlight includes a light guide panel, an optical sheet, and a light source,
wherein the light source includes a metal plate, a first wiring substrate with first LEDs mounted thereon and a second wiring substrate with second LEDs mounted thereon, the first wiring substrate and the second wiring substrate being bonded to respective sides of the metal plate,
wherein the first LEDs are arranged on a first line, and the second LEDs are arranged on a second line,
wherein the light guide panel includes a concave portion extending parallel to a side of the light guide panel,
wherein the light source is placed in the concave portion,
wherein the first LEDs emit light in a first direction, and the second LEDs emit light in a direction opposite to the first direction, and
wherein the first LEDs and the second LEDs are arranged alternately in an extending direction of the concave portion.

4. A liquid crystal display device comprising a liquid crystal display panel and a backlight,
wherein the backlight includes a light guide panel, an optical sheet, and a light source,
wherein the light source includes a resin sheet, a first wiring substrate with first LEDs mounted thereon and a second wiring substrate with second LEDs mounted thereon, the first wiring substrate and the second wiring substrate being bonded to respective sides of the resin sheet,
wherein the first LEDs are arranged on a first line, and the second LEDs are arranged on a second line,
wherein the light guide panel includes a concave portion extending parallel to a side of the light guide panel,
wherein the light source is placed in the concave portion,
wherein the first LEDs emit light in a first direction, and the second LEDs emit light in a direction opposite to the first direction, and
wherein the first LEDs and the second LEDs are arranged alternately in an extending direction of the concave portion.

5. The liquid crystal display device according to claim 3, comprising a connector to supply power to the backlight, wherein a leader line for connecting one terminal of the first LEDs in the first wiring substrate with the connector exists outside the first LEDs arranged on the first line, wherein a leader line for connecting one terminal of the second LEDs in the second wiring substrate with the connector exists outside the second LEDs arranged on the second line, and wherein the connector for supplying power to the backlight exists on one side of the light guide panel and not on other sides of the light guide panel.

6. The liquid crystal display device according to claim 4, comprising a connector to supply power to the backlight, wherein a leader line for connecting one terminal of the first LEDs in the first wiring substrate with the connector exists outside the first LEDs arranged on the first line, wherein a leader line for connecting one terminal of the second LEDs in the second wiring substrate with the connector exists outside the second LEDs arranged on the second line, and wherein the connector for supplying power to the backlight exists on one side of the light guide panel and not on other sides of the light guide panel.

\* \* \* \* \*